(12) United States Patent
Eisen (10) Patent No.: US 11,093,656 B2
(45) Date of Patent: Aug. 17, 2021

(54) CHANGE-TOLERANT METHOD OF GENERATING AN IDENTIFIER FOR A COLLECTION OF ASSETS IN A COMPUTING ENVIRONMENT

(71) Applicant: Irdeto B.V., Hoofddorp (NL)

(72) Inventor: Philip Allan Eisen, Kanata (CA)

(73) Assignee: IRDETO B.V., Hoofddorp (NL)

( * ) Notice: Subject to any disclaimer, the term of this patent is extended or adjusted under 35 U.S.C. 154(b) by 174 days.

(21) Appl. No.: 16/190,199

(22) Filed: Nov. 14, 2018

(65) Prior Publication Data

US 2020/0151367 A1 May 14, 2020

(51) Int. Cl.
  *G06F 21/73* (2013.01)
  *G06F 21/12* (2013.01)
  *H04L 9/08* (2006.01)

(52) U.S. Cl.
  CPC ............ *G06F 21/73* (2013.01); *G06F 21/125* (2013.01); *H04L 9/085* (2013.01); *G06F 2221/0724* (2013.01)

(58) Field of Classification Search
  CPC .............. H04L 9/085; H04L 9/0891; G06F 2221/0724; G06F 21/73; G06F 21/125
  See application file for complete search history.

(56) References Cited

U.S. PATENT DOCUMENTS

| 10,599,855 | B2* | 3/2020 | Eisen | G06F 21/70 |
| 2004/0177168 | A1* | 9/2004 | Alabraba | G06F 21/73 |
| | | | | 710/1 |
| 2008/0098482 | A1* | 4/2008 | Hughes | G06F 21/125 |
| | | | | 726/26 |
| 2008/0115173 | A1* | 5/2008 | Ellis | H04N 21/4828 |
| | | | | 725/61 |
| 2009/0313480 | A1* | 12/2009 | Michiels | G06F 21/10 |
| | | | | 713/187 |

(Continued)

OTHER PUBLICATIONS

P.V. Siva Kumar, "Multi-Level Secret Sharing Scheme for Mobile Ad-Hoc Networks", Int. J. Advanced Networking and Applications, vol. 6 Issue: 2 pp. 2253-2261 (2014), 9 pages (Year: 2014).*

(Continued)

*Primary Examiner* — Kevin Bechtel
*Assistant Examiner* — Han Yang
(74) *Attorney, Agent, or Firm* — Rimon PC; Marc Kaufman (57) ABSTRACT

A change-tolerant method of generating a fingerprint of a computing environment based on asset parameters associated components of the computing environment. Asset parameters are grouped into multiple subsets based on characteristics of the components. A share is generated for each asset parameter of the category to produce a plurality of shares. A secret sharing algorithm is applied to the subsets to generate a plurality of candidate identifiers corresponding to the plurality of subsets of shares. A candidate identifier is selected from the plurality of candidate identifiers as a final identifier for each category based at least in part on a frequency of occurrence of that candidate identifier. The final identifiers are combined into a fingerprint corresponding to the computing environment, wherein the fingerprint is provides verification of the plurality of components without requiring individual verification of any shares in the plurality of shares.

8 Claims, 7 Drawing Sheets

(56) References Cited

U.S. PATENT DOCUMENTS

| | | | | |
|---|---|---|---|---|
| 2010/0215172 A1* | 8/2010 | Schneider | ............... | H04L 9/085 |
| | | | | 380/28 |
| 2012/0166317 A1* | 6/2012 | Karnik | ................ | G06Q 10/087 |
| | | | | 705/28 |
| 2014/0007252 A1* | 1/2014 | Eisen | ...................... | G06F 21/70 |
| | | | | 726/26 |
| 2016/0042183 A1* | 2/2016 | Ciordas | .................. | G06F 11/10 |
| | | | | 726/26 |

OTHER PUBLICATIONS

Hossein Ghodosi, "Secret Sharing in Multilevel and Compartmented Groups", Proc. ACISP 1998, LNCS, vol. 1438,367-378, Springer Verlag, 1998, 12 pages (Year: 1998).*

* cited by examiner

CHANGE-TOLERANT METHOD OF GENERATING AN IDENTIFIER FOR A COLLECTION OF ASSETS IN A COMPUTING ENVIRONMENT

FIELD OF THE INVENTION

The present disclosure relates generally to generating identifiers for collections of assets. More particularly, the present disclosure relates to a change-tolerant method of generating an identifier for a collection of assets in a computing environment using a secret sharing scheme.

BACKGROUND

Many protection technologies for computing environments, such as personal computer (PC) systems need a mechanism to robustly identify the PC on which the application is running. This is generally accomplished by reading out identifiers from various assets of the system, such as hardware elements (motherboard parameters, BIOS, MAC address, hard disk, CD/DVD player, graphics card, I/O controllers) that are integrated into the computer. These identifiers are then combined into an identifier, i.e., a "fingerprint", of the system. For example, a simple way to derive the fingerprint of a system is applying an exclusive-or (XOR) to all device identifiers.

A basic fingerprinting algorithm gathers assets from a system and combines them in some fashion to produce a smaller value known as the fingerprint. This fingerprint serves as an identifier for the device: it should deterministically produce the same fingerprint every time the same algorithm runs. However, the identifier may or may not be unique; this is a factor of the quality of the assets.

But in many cases the set of assets subjected to the fingerprinting algorithm changes. This might happen for nefarious reasons (a deliberate attempt to change the identity of a computing component, for example), but most often is just a consequence of a user legitimately updating the software or hardware on their system by updating the operating system, swapping out a hard drive, or other acceptable changes to computing components. If any asset, e.g. a computing component changes, a basic fingerprinting algorithm will result in that the computed fingerprint will change. Depending on the use case, this is often undesirable.

As computer components, or other assets, change, such as due to replacement and repairs, a method to determine the system identifier needs to accommodate acceptable changes to the component identifiers. One way of supporting component updates is by allowing a few component identifiers to change while still generating the same system identifier. A known way to achieve this is by recording the unique component identifiers during an initialization phase and, during the identifier calculation phase, comparing the recorded identifiers with the actual identifiers and, if a sufficient match exists, using the recorded identifiers to calculate the fingerprint of the system.

There are similar methods that derive a fingerprint of a system from a collection of contributing pieces of information that may change over time. Although based on different contributing information, such methods also need to accommodate changes to the contributing information without changing the calculated fingerprint. As before the contributing information can be recorded and used as the identifiers if there is a sufficient match between the actual information and the recorded information.

One problem with such methods is that the comparison of the recorded identifiers with the retrieved parameters is sensitive to attacks. The presence of the recorded device identifiers is the key enabler for these attacks. It is, therefore, desirable to provide a method of generating a fingerprint of a system that is tolerant of changes in the computing environment, while being resistant to malicious attacks.

One method, known as "M of N fingerprinting," seeks to solve the problem of combining asset (e.g. computing element) information on a hostile and volatile computing system, to produce a fingerprint of the system. The goal is to allow the fingerprint to remain the same even if some of the assets, such as computing elements, change; up to a predetermined threshold. Further, this should be accomplished without storing the expected asset parameters, as this would present an easy attack vector.

However, if too many assets are allowed to change, i.e. the threshold is too high, without a change in the resulting fingerprint, the results can be problematic. For example, in the extreme case where all assets can change, the result is a situation where any combination of assets will necessarily produce the same fingerprint, meaning the fingerprint is not actually an identifier at all. In an "M of N fingerprinting algorithm," as long as M or more assets out of N stay the same, the algorithm will produce the same result, i.e. the same fingerprint. In such an approach, all assets are treated equally. It does not matter which assets match and which change, as long as the threshold is reached.

As described, the value M is the threshold—if fewer than M assets match, the wrong fingerprint will be produced (with overwhelming probability), and if M or more assets match, the right fingerprint will be produced. This can be generalized somewhat by allowing the threshold to be loose. For example, only the negative case can be supported—if fewer than M assets match, the wrong fingerprint is produced. Conversely, most but not all cases where M or more assets match will produce the right fingerprint (certainly, the case where all N assets match will do so). As another example, only the positive case can be supported—guaranteeing the correct fingerprint if M or more assets match, and having most cases of fewer than M assets matching producing the wrong fingerprint. Such a loosening may offer a performance trade-off.

US Published Patent Application No. 2014/0007252 discloses a change-tolerant method of generating an identifier for a collection of assets associated with a computing environment using an M of N fingerprinting algorithm. Each of the assets has an identifying asset parameter associated therewith. The asset parameters for the collection of assets are retrieved and a share is generated corresponding to each asset parameter to provide a plurality of shares. "Shares" are known to be used in "secret sharing" methods, i.e. methods for distributing a secret amongst a group of participants, each of whom is allocated a share, or a portion, of the secret. The secret can be reconstructed only when a sufficient number of shares are combined. Individual shares are of no use on their own.

In the method disclosed in US Published Patent Application No. 2014/0007252, a secret sharing algorithm is applied to a number of subsets of the plurality of shares to derive a plurality of candidate identifiers (fingerprints); the number of subsets being determined in accordance with a tolerance threshold for differences in the asset parameters as compared to original asset parameters of the computing environment. A most prevalent of the candidate identifier values is determined and designated as a final identifier, i.e. fingerprint, for the collection of assets. The final identifier can be used, for example, to determine if a software application can be validly executed on a computing platform that is the collection of assets. The secret sharing algorithm can be a (M−k, N) secret sharing algorithm, where N is the number of the plurality of shares, M is a number of shares that have a correct value (thus M<N), and k is a predetermined constant. The tolerance threshold is equal to N−M. However, in the case of case M=1, i.e. only 1 asset in the set remains the same, the method breaks down. Also, when N is large, e.g. greater than 10 in one example, the method can exhibit performance issues. These limitations render the approach discussed above not programmatic in many implementations.

SUMMARY

An implementation includes a change-tolerant method of generating a fingerprint of a computing environment including a plurality of components, each of the components having an asset parameter associated therewith, the method comprising: retrieving asset parameters for each of the components; grouping the asset parameters into multiple subsets based on characteristics of the components corresponding to the asset parameters, each category having at least one asset parameter; for each subset of asset parameters: generating a share corresponding to each asset parameter of the category to produce a plurality of shares; modifying the share using the asset parameter; applying a secret sharing algorithm to a plurality of subsets of the shares to generate a plurality of candidate identifiers corresponding to the plurality of subsets of shares; and selecting a candidate identifier from the plurality of candidate identifiers as a final identifier for the category based at least in part on a frequency of occurrence of that candidate identifier; and combining the final identifiers into a fingerprint corresponding to the computing environment, wherein the fingerprint is configured to provide verification of the plurality of components without requiring individual verification of any shares in the plurality of shares.

Another implementation includes a system for generating a change-tolerant fingerprint of a computing environment, the environment including a plurality of components, each of the components having an asset parameter associated therewith, the system comprising: at least one computer hardware processor; at least one memory storing instructions thereon which, when executed by the at least one processor, cause the at least one processor to: retrieve asset parameters for each of the components; group the asset parameters into multiple subsets based on characteristics of the components corresponding to the asset parameters, each category having at least one asset parameter; for each subset of asset parameters:
generate a share corresponding to each asset parameter of the category to produce a plurality of shares; modify the share using the asset parameter; apply a secret sharing algorithm to a plurality of subsets of the shares to generate a plurality of candidate identifiers corresponding to the plurality of subsets of shares; and select a candidate identifier from the plurality of candidate identifiers as a final identifier for the category based at least in part on a frequency of occurrence of that candidate identifier; and combine the final identifiers into a fingerprint corresponding to the computing environment, wherein the fingerprint is configured to provide verification of the plurality of components without requiring individual verification of any shares in the plurality of shares.

Another implementation includes a non-transient computer readable media having computer readable instruction stored there for generating a change-tolerant fingerprint of a computing environment, the environment including a plurality of components, each of the components having an asset parameter associated therewith, the instructions, when executed by at least one computer hardware processor, cause the at least one computer hardware processor to: retrieve asset parameters for each of the components; group the asset parameters into multiple subsets based on characteristics of the components corresponding to the asset parameters, each category having at least one asset parameter; for each subset of asset parameters: generate a share corresponding to each asset parameter of the category to produce a plurality of shares; modify the share using the asset parameter; apply a secret sharing algorithm to a plurality of subsets of the shares to generate a plurality of candidate identifiers corresponding to the plurality of subsets of shares; and select a candidate identifier from the plurality of candidate identifiers as a final identifier for the category based at least in part on a frequency of occurrence of that candidate identifier; and combine the final identifiers into a fingerprint corresponding to the computing environment, wherein the fingerprint is configured to provide verification of the plurality of components without requiring individual verification of any shares in the plurality of shares.

BRIEF DESCRIPTION OF THE DRAWINGS

Implementations will now be described, by way of example only, with reference to the attached Figures.

DETAILED DESCRIPTION

The disclosed implementations provide a secure, change-tolerant, method for creating a fingerprint for a computing environment from a set of N shares even when only M shares (M<N) from this set have a correct value. The method can use all subsets of M−1 shares from the N shares to generate candidate identifiers.

The implementations can be adapted to use any (M−1, N)-secret sharing scheme. The method can be used generally to generate a fingerprint for any collection of assets for which asset parameters, as identifiers, can be assigned or determined. As used herein, an "asset" can be a component, e.g., any data, application, device, node or other component of a computing environment. Components generally include hardware (e.g. servers and switches), software (e.g. mission critical applications and support systems) and confidential information. The terms "computing environment", "computer environment" and "computer system" are used herein interchangeably, and are intended to encompass single computers and other devices including a processor, distributed computing systems, components thereof, data stored or otherwise associated therewith, and including the data associated with users of such computer systems, attached or accessible peripheral devices, software applications and operating systems, and combinations thereof. As used herein, "asset parameter" means an assigned or determined parameter that is limited in occurrence for a given class of component, situation, or area. Asset parameters may be unique or may exclusively identify a component at least at the time the parameter is assigned or determined. Asset parameters can be expressed as, for example, numbers, symbols, strings of numbers and characters, or functions.

An example system in which the implementations can be used is a computer system that has a number of peripheral devices as components; each having a more or less unique device identifier, such as a serial number or other assigned asset parameter. Generally, such device identifiers are assigned to a device by the manufacturer. The computer system can be a network of embedded microcontrollers in which each microcontroller, as a component, has a unique identifier. Such configurations commonly occur in more complex systems (e.g. airplanes, cars, industrial machines) that are repaired by replacing entire microcontroller modules. In such systems it may be beneficial to link the firmware for the controllers to the particular networked set. Data sources associated with, or stored on, a computer system can also be considered assets. Examples include contact lists, user preference settings, name, address, dates or other parameters that change relatively infrequently. Asset parameters can be obtained by applying a function to parameters associated with one or more assets. For example, an asset parameter may result from a function that takes parameters associated with components such as a computer memory, a particular application, or a collection of files as input. Certain asset parameters may also require user input (e.g. a password, the inserting of a removable data source or the scanning of a fingerprint) in order to become available for processing by the method described herein.

The disclosed implementations can be applied for node locking or other fingerprinting applications. Node locking is relevant to a wide range of applications in different fields. It can be used, for example, on personal computers (PCs), embedded devices and other computing platforms. One implementation is in the form of a fingerprinting application that permits node locking. Node locking is a feature that limits a particular application to execute on a single or a specific set of computing platforms (e.g. a PC, a set-top box, a game console or a mobile phone). If the application is attempted to be executed on a different computing platform, the application will fail to execute or will result in performance of a different operation as compared to the operation performed on the platform(s) that it is intended to execute on.

When used with node locking, an application can be linked to a collection of asset parameters obtained from components in the computer platform. This means that the application has a personalization stage where it is configured for execution on the intended computer platform. During a later stage, the application will collect the asset parameters from the elements in the computer platform on which it is executing in order to derive a system identifier (fingerprint). The system identifier can be used for a wide range of functions that the application only supports on that particular computer platform. The implementations permit one or more of the asset parameters collected at the later stage to differ from the original asset parameters used in personalizing the application, while still returning a valid fingerprint that results in proper execution of the application.

Effectively, the implementation turns a set of N shares into an identifier. The method uses all subsets of M−1 shares from the N shares to generate a candidate identifier with an (M−1, N) secret sharing algorithm. Whichever of the generated candidate identifiers occurs the most frequently can be used as the final resulting identifier. A variant method terminates as soon as a candidate identifier with a given value occurs more than M times. Note that for a valid identifier to be produced by this method, at least M shares must be correct in which case a candidate identifier will occur at least M times.

Figure 1:
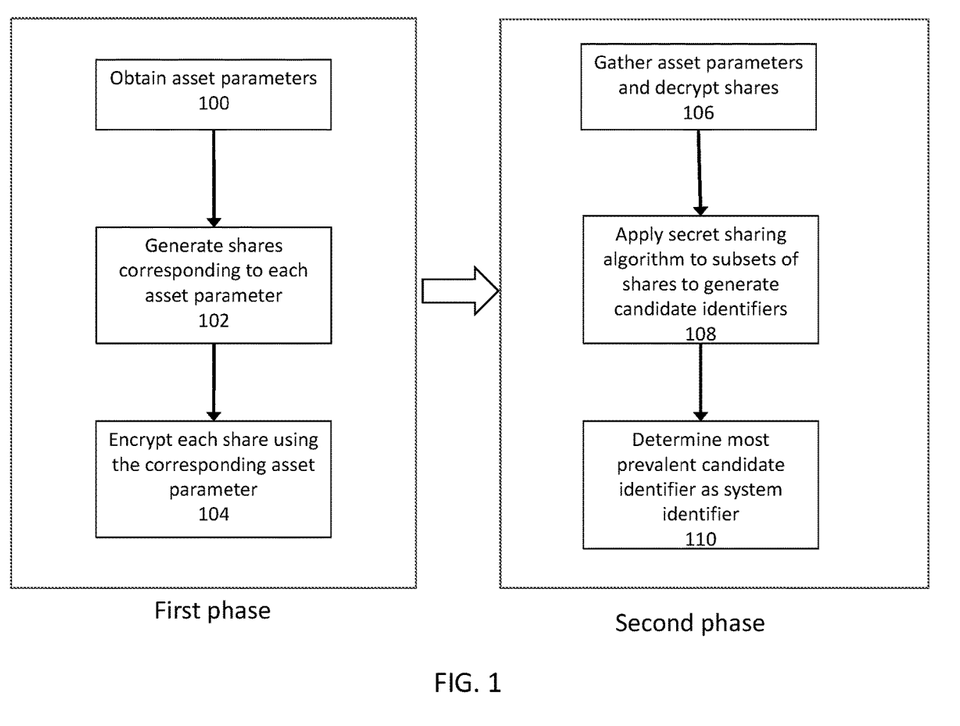
FIG. 1 is a flowchart of a method in accordance with an implementation.

As shown in FIG. 1, one implementation is a method of identifying or validating a collection of assets, such as components of a computer system, for execution of an application, such as for node locking, using a fingerprinting method. A number of asset parameters are associated with the collection of assets to be validated. The asset parameters can be any adequately unique parameter, such as a serial number of the element or an otherwise assigned string associated with the asset. While the method is described in relation to validating a collection of assets for execution of a software application on a computer platform, it will be understood that the method can be used to validate, or confirm the identity of, a collection of assets for any operation to be performed on or in conjunction with the collection of assets, and where a variation between the original assets of the collection is permitted. A correct system identifier is returned even when an allowable number of asset parameters have changed since the application was first validated for execution on the collection of assets. The degree of variation, e.g. the allowable number of parameters, is determined by a tolerance threshold, which can be set by the application distributor or others.

The method begins with a first phase of fingerprint initialization involving the retrieval, or other collection, of the asset parameters for the collection of assets at 100. A share corresponding to each asset parameter is then generated to provide a plurality of shares at 102. Examples of shares and sharing algorithms used with the implementations are set forth in greater detail below. Each share can correspond to an asset parameter or asset parameters can be combined or otherwise processed to create each shares, as described in greater detail below. The shares are then encrypted using the corresponding asset parameters at 104. Examples of encryption methods used with the implementations are set forth in greater detail below.

In a second phase of fingerprint computation, the asset parameters are retrieved, and used to decrypt the shares at 106. Only correct asset parameters will result in correct shares. A secret sharing algorithm is then applied to a number of subsets of the shares to derive a plurality of candidate identifiers each having a candidate identifier value at 108. The number of subsets is determined in accordance with a tolerance threshold which is related to the acceptable difference in the asset parameters as compared to initial asset parameters of the collection of assets. In other words, the tolerance threshold is a measure of the amount of variation in the asset parameters for which the application, or other operation, was originally validated, as deemed acceptable by the application creator or others. The most prevalent of the candidate identifier values is determined, and the most prevalent candidate identifier value is then selected as the final identifier at 110. The final identifier is used for the relevant determination such as to determine if the application can be validly executed on the collection of assets.

Figure 2:
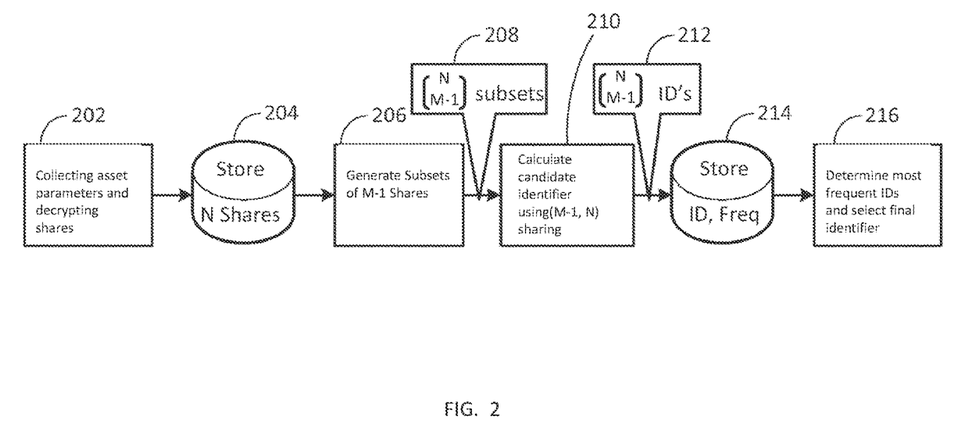
FIGS. 2-3 are diagrams of a fingerprinting method according to an implementation.

An implementation of an application performing a fingerprinting computation according to the invention is shown in FIG. 2. The method starts by first gathering the asset parameters on the target device and using them to decrypt the shares at 202, in the manner described in detail below for example. Some of the asset parameters and the related shares may have a value that is different from the same asset parameter used during personalization, or initialization, of the application. This will result in the corresponding shares being incorrect. The N decrypted shares are stored in a memory at 204. From all the recorded shares all possible subsets of M−1 shares are generated at 206. For each of the $$\binom{N}{M-1}$$

subsets 208, a candidate identifier is calculated using a (M−1, N)-secret sharing algorithm at 210. Any suitable (M−1, N)-secret sharing algorithms can be used, depending on the application and functional requirements. Well-known (M−1, N)-secret sharing algorithms include, for example, Shamir's and Blakley's secret sharing algorithms. Shamir's scheme is disclosed in Shamir, Adi (1979), "How to Share a Secret", Communications of the ACM, 22 (11): 612-613.

For each of the candidate identifier 212 that the secret sharing module produces, the candidate identifier 'ID' and the number of times it has been produced as an output 'Freq' is recorded at 214 in a storage using, for example, a suitable indexing mechanism to efficiently retrieve and update the frequency of occurrence 'Freq' for a given candidate identifier 'ID'. After processing all subsets to generate $$\binom{N}{M-1}$$

IDs 212, the stored {ID, Freq} data pairs are processed to find the candidate identifier with the highest frequency and this candidate identifier is selected as the final identifier at 216, i.e., the fingerprint. The frequency of the final identifier, among the candidate identifiers, is an indication of the error rate in the asset parameters. If made available to the application it may be used for diagnostic, recovery, or other purposes.

Figure 3:
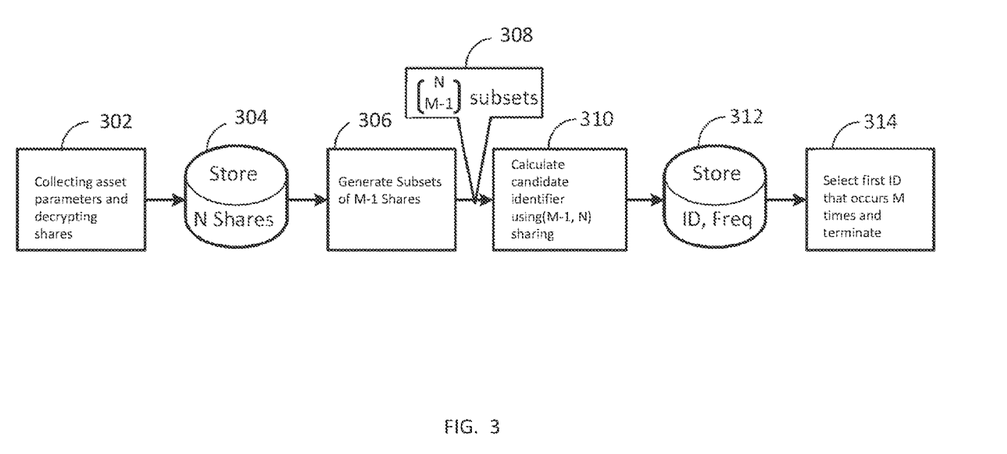

Another implementation of the fingerprinting method is shown in FIG. 3. The method again starts by first extracting, reading, or otherwise obtaining, asset parameters from the assets in the system and using them to decrypt the shares at 302, and storing the N shares in a memory at 304. From all the recorded shares all possible subsets of M−1 shares are generated at 306. While processing $$\binom{N}{M-1}$$

subsets 308 at 310, the candidate identifier values are monitored as they are placed into the store 312. The first candidate identifier value that occurs M times is selected as the final identifier and terminates the method at 314. This implementation can reduce processing time/resources, but there is no indication of the error rate in the asset parameters and the time of terminating the process may be used as a point of attack.

As described above, shares are generated corresponding to asset parameters. However, for most embodiments, the share value will be unrelated to the asset parameter. In order to properly tie the shares to the asset parameters, so that an incorrect asset parameter will result in an incorrect share, the shares must be modified (encrypted) during an initialization phase. This may be implemented by transmitting asset parameters to another application that generates and encrypts the shares (possibly using another verification mechanism such as a personal contact or a telephone conversation) and returns the encrypted shares. It also is possible to deploy the installation with a built-in initialization component that is disabled after completion of the initialization process.

Figure 4:
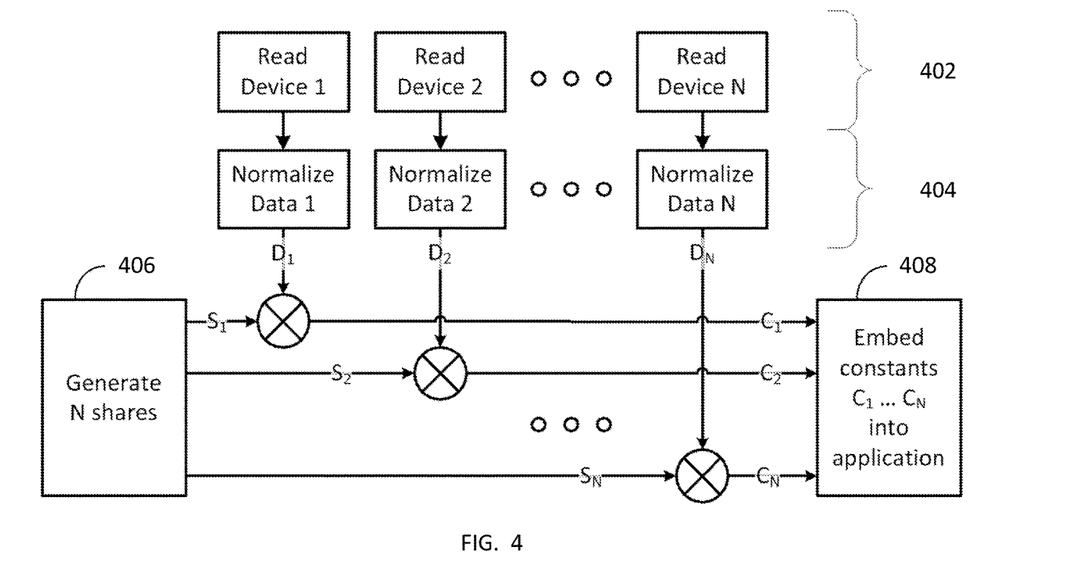
FIG. 4 is a diagram of a share encryption process according to an implementation.

A diagram of an implementation of the initialization process, of an application for example. is shown in FIG. 4. An initialization function running at the target computer first obtains a suitable number of parameters by reading asset parameters for assets 1 to N at 402. In an embodiment, the asset parameters are then normalized at 404. The normalization can be accomplished by, for example, using a hash function, to generate a set of normalized asset parameters $\{D_1, D_2, \ldots D_N\}$.

During the initialization, N shares $\{S_1, S_2 \ldots S_N\}$ are generated at 406. As will be understood by those of skill in the art, the manner in which the shares are generated, or constructed, depends on the secret-sharing method used. Again, some examples are set forth below. If Shamir's secret sharing algorithm is used, a polynomial with random coefficients is constructed, with the expected identifier being the constant coefficient for the polynomial. The degree of the polynomial is dependent on M, as determined by design and security considerations. The shares are then determined by evaluating the polynomial for chosen inputs. Each share $S_i$ is combined with the corresponding asset parameters $D_i$ using a function $E(D_i, S_i)$. The function E( ) can be seen as an encryption of the share $S_i$ using the asset parameter $D_i$ and producing the ciphertext constant $C_i$. A simple implementation of E( ) is an XOR operation. The final initialization step embeds the ciphertext constants $\{C_1, C_2, \ldots C_N\}$ as initialization information into the application at 408.

Figure 5:
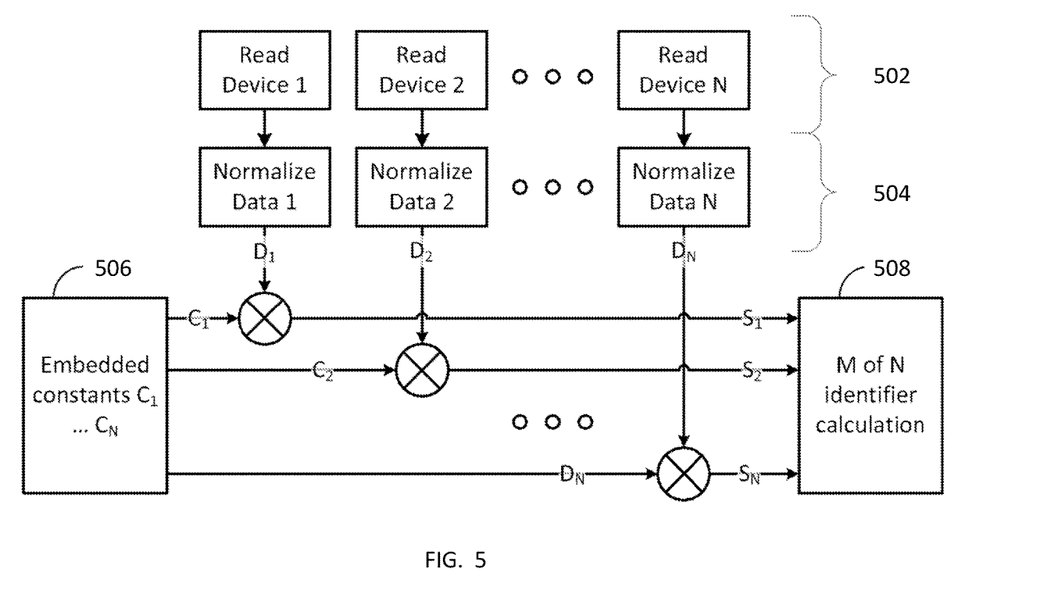
FIG. 5 is a diagram of a share decryption process according to an implementation.

An implementation of the decryption of shares during validation of the application is shown in FIG. 5. The device parameters are again acquired at 502 and normalized at 504 to produce a set of asset normalized parameters $\{D_1, D_2, \ldots D_N\}$. The initialization information in the application contains the ciphertext constants $\{C_1, C_2, \ldots C_N\}$. Each ciphertext constant $C_i$ is combined with the corresponding asset parameter $D_i$ using a function $D(D_i, C_i)$ at 506. The function D( ) can be seen as an decryption of the ciphertext constant $C_i$ with the asset parameter $D_i$ and producing the share $S_i$. A simple implementation of D( ) is an XOR operation. The personalized application then uses the shares in the calculation of the final identifier of the collection of assets as described above at 508.

Figure 6:
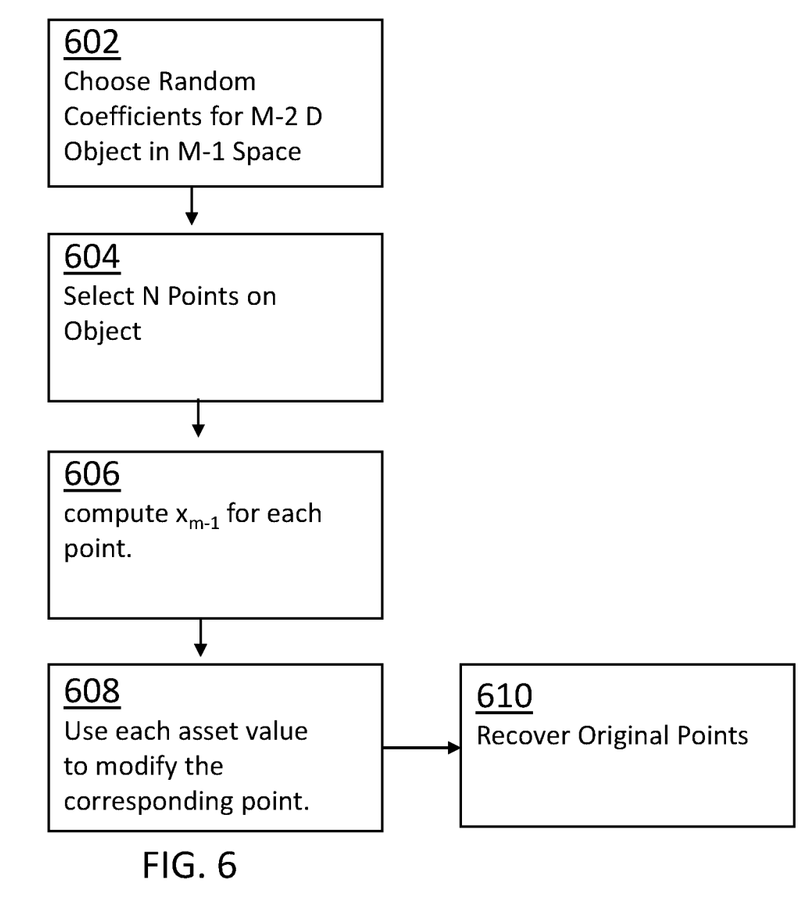
FIG. 6 is a flowchart of a sharing algorithm according to an implementation.

Encrypting shares using asset information can be made arbitrarily complicated, as long as it is reversible. A more complex method may be useful, especially for low-entropy assets, because that will make it harder for the attacker to guess the real share values and thus the expected fingerprint. Some other examples for encrypting when the shares are for a Shamir or Blakeley secret sharing scheme include:

Choose a different coordinate for each point;
Choose additional constant coefficients (xor with 3423*asset+8979);
Combine with multiple coordinates; and/or
AES encryption, with the asset parameter as a key An implementation can use an algorithm inspired by Shamir's sharing scheme for secret sharing. As illustrated in FIG. 6, random coefficients $a_1, \ldots, a_{m-1}$ are chosen for an M−2 dimensional object in M−1 space at step 602. The underlying finite field will be defined by the polynomial $x^{31}+x^3+1$; thus, all coordinates are 31-bit values. The fingerprint will be the value $a_{m-1}$. At 604 N points on the object are selected; for each point, $x_1$ through $x_{m-2}$ are selected at random. At 606, the object formula is evaluated to compute $x_{m-1}$. At 608, the asset parameters are used to modify the points. The asset parameters can be used in various manners. For example, for each of the N assets, its value can be XORed with one of the coordinates of the corresponding point. At 610 the same function as in step 608 can be accomplished at run-time to recover the original point. Therefore, if the value of asset i changes, the computed coordinate will be wrong, and the result will be a point which is not on the defined object.

Figure 7:
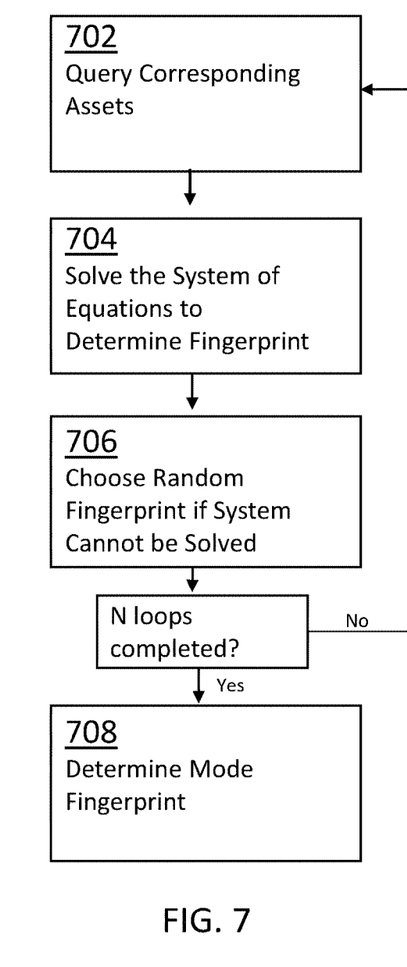
FIG. 7 is a flowchart of a process for computing a fingerprint at runtime according to an implementation.

FIG. 7 illustrates an implementation for computing a fingerprint at runtime, the following steps can be accomplished. The method loops over all $$\binom{N}{M-1}$$

subsets of the N modified points. At 702, the corresponding assets are queried to decrypt the points. (Again, if the asset parameter is wrong, the decryption will be wrong.) At 704, the system of equations generated by the M−1 decrypted points is solved to uniquely identify the object coefficients, specifically the value $a'_{m-1}$. This is a candidate fingerprint. If the system cannot be solved, a candidate fingerprint is chosen at random in step 706. At 708, the mode (i.e. the value that occurs most often) is determined amongst the candidate fingerprints. This is the computed fingerprint. If there is no mode, choose one of the candidates at random.

If all of the M−1 chosen assets are correct, then all points will be properly decrypted and the M−1 resulting points will be points on the original object. Solving the system of equations will uniquely identify that object, and thus the candidate fingerprint $a'_{m-1}$ will match the expected fingerprint $a_{m-1}$. If one or more of the assets are incorrect, then the result will be one or more points which are not on the original object. Importantly, these points, along with the correct points, are on some object, and solving the system of equations will uniquely identify that object and produce a candidate fingerprint. However, this object is essentially random, and therefore its constant coefficient $a'_{m-1}$ will be different from the expected value with very high probability. Moreover, any such subset is again choosing an object at random, and therefore with very high probability the candidate fingerprints for all subsets in this case will be different.

Putting these cases together, we find that every correct subset will return the same value, while every incorrect subset will return a different random value. How many correct subsets are there? If P>M−2 assets are correct, then there will be $$\binom{P}{M-1}$$

subsets where the expected fingerprint is computed. For P>M−1 (in other words, if M or more assets match), this value is greater than 1. Thus, if M or more assets match, the correct fingerprint should occur more often than any incorrect candidate. Stated differently, the correct fingerprint will be the mode. Below, some specific examples are considered.

A specific example, where M=3, N=5, is described below. Since M=3, we will be working in 2-space, with a 1-dimensional object (a line). First, by generating random coefficients $a_1$ and $a_2$ over the field $x^{31}+x^3+1$.

$a_1$=0x3fcdaced
$a_2$=0x330906e5

The bold value is the expected fingerprint. Next, N=5 points are generated. A random $x_1$ coordinate is selected:
$x_1$=0x73e4db5f
Then the $x_2$ coordinate is computed by evaluating $x_2=a_1x_1+a_2$.

$x_2$=0x3fcdaced*0x73e4db5f+0x330906e5=0x682705f5

Similarly, the other 4 points are:
(0x08832839, 0x59541383)
(0x54cbdb10, 0x3f8c1354)
(0x5a039a52, 0x2d6fdc12)
(0x5810fa43, 0x5603fc5e)

The last step in generating the auxiliary data is to modify each of the points by XORing one of the coordinates with the corresponding asset parameter. Assuming that the asset parameters are as follows (note that it does not matter how these values are generated):

0x178bd75d, 0x3602ae05, 0x6c33b51d, 0x51fc7e78, 0x03f96774

For simplicity, the last coordinate of the point is always altered. The final auxiliary data is the set of modified points, as:

(0x73e4db5f, 0x7facd2a8)
(0x08832839, 0x6f56bd86)
(0x54cbdb10, 0x53bfa649)
(0x5a039a52, 0x7c93a26a)
(0x5810fa43, 0x55fa9b2a)

Assuming that, at runtime, all assets still have their original values. Because M=3, all subsets of points having size 2 ($_5C_2$=10 in total) will be looked at. For each subset, a matrix will be constructed Gaussian elimination will be applied to the matrix to solve for $a'_2$. The matrix looks like

| $x_{i1}$ | 1 | $x_{i2}$+$asset_i$ |
|---|---|---|
| $x_{ji}$ | 1 | $x_{j2}$+$asset_j$ |

For the first subset (first 2 points), the matrix is:

| 0x73e4db5f | 1 | 0x682705f5 |
|---|---|---|
| 0x08832839 | 1 | 0x59541383 | which row reduces as

| 0x73e4db5f | 0x00000001 | 0x682705f5 |
|---|---|---|
| 0x00000000 | 0x12dc87c2 | 0x3d061af9 |

Thus $a_2'=(0x12dc87c2)^{-1}*0x3d061af9=0x330906e5=a_2$

This is as expected, since the asset parameters were correct. Doing the same calculations for every other pair of points, the candidate fingerprints will be as follows:

0x330906e5, 0x330906e5, 0x330906e5, 0x330906e5, 0x330906e5,

0x330906e5, 0x330906e5, 0x330906e5, 0x330906e5,

Of course, the mode of these numbers is 0x330906e5, and the algorithm returns the expected fingerprint. Assuming however, that something on the system has changed over time, resulting in a change to one of the asset parameters, instead of returning 0x3602ae05 when queried, asset 2 returns 0x7ab017ee. Sometimes asset changes will result in values that are very close to the original, sometimes the new value will have no relation to the old one. This is immaterial; all wrong values are equally wrong. It would be expected that any computation that does not involve asset 2 would still return the expected fingerprint, and that is exactly what happens. The candidate fingerprints now look like:

0x04e66aef, 0x330906e5, 0x330906e5, 0x330906e5, 0x621533ac,

0x00915a69, 0x795f839e, 0x330906e5, 0x330906e5, 0x330906e5

The mode (indeed, the only number that appears more than once) is still 0x330906e5. In the case of two incorrect assets; $C_2$=3 subsets will result in the correct candidate while the other 7 will be random. The correct value is still the mode. What about when fewer than M assets match? We now assume that the asset parameters are:

0x178bd75d, 0x7ab017ee, 0x517c2609, 0x700dbe0d, 0x03f96774

In other words, assets 2, 3 and 4 no longer match. The candidate fingerprints are now:

0x04e66aef, 0x44d15679, 0x6098fc2b, 0x330906e5, 0x0c267ff8,

0x724c4d0b, 0x795f839e, 0x30e8ea94, 0x4e7d980e, 0x6ace9106

No value appears more than once, so there is no mode, and the algorithm returns a fingerprint at random. This will be the outcome if 4 or 5 assets are incorrect as well. Note that the correct fingerprint does still appear in the list, but it is now indistinguishable from the incorrect candidates.

An example where M=5, N=10 is discussed below to demonstrate how the data sizes change. Assume that the randomly chosen equation is:

$$x_4 = 0x3fcdaced * x_1 + 0x330906e5 * x_2 + 0x73e4db5f * x_3 + 0x08832839$$

N=10 points in 4-space are selected at random:
(0x54cbdb10, 0x5a039a52, 0x5810fa43, 0x1b72fd07)
(0x178bd75d, 0x6f9a706a, 0x3602ae05, 0x2b42649b)
(0x7ab017ee, 0x6c33b51d, 0x517c2609, 0x404f75c5)
(0x51fc7e78, 0x700dbe0d, 0x03f96774, 0x385979d9)
(0x5a130904, 0x1209b031, 0x5cb3fba7, 0x162fe7c1)
(0x2d9dc2db, 0x60d31abb, 0x11af7f29, 0x4afbcdf2)
(0x3a2d6e09, 0x30e58a9d, 0x32be6d26, 0x71d1b64c)
(0x60d278f6, 0x310a5ad2, 0x0b601129, 0x199e30aa)
(0x3d0ff400, 0x44594b3d, 0x392091d3, 0x1dcb5803)
(0x2250c8b4, 0x366a85f6, 0x12692ff2, 0x27a80276)

Modified by the 10 asset parameters, these values become:
(0x54cbdb10, 0x5a039a52, 0x5810fa43, 0x11532204)
(0x178bd75d, 0x6f9a706a, 0x3602ae05, 0x2a3ee0c0)
(0x7ab017ee, 0x6c33b51d, 0x517c2609, 0x060c8fe7)
(0x51fc7e78, 0x700dbe0d, 0x03f96774, 0x6016b457)
(0x5a130904, 0x1209b031, 0x5cb3fba7, 0x1d470aaf)
(0x2d9dc2db, 0x60d31abb, 0x11af7f29, 0x0d20be84)
(0x3a2d6e09, 0x30e58a9d, 0x32be6d26, 0x6e2047cc)
(0x60d278f6, 0x310a5ad2, 0x0b601129, 0x579eddf3)
(0x3d0ff400, 0x44594b3d, 0x392091d3, 0x66dea499)
(0x2250c8b4, 0x366a85f6, 0x12692ff2, 0x009fc344)

It can be seen that the values $C_1 \ldots C_N$ grow linearly with both M and N. However, even for fairly large values such as M=10, N=50, only 1800 bytes of data are required.

The basic algorithm requires M>2 (because an M-2 dimensional object is created). Sometimes there may be a need to have M=1. This case can be addressed by adding an additional point to the auxiliary data (N+1 points total) and modifying it via a fake asset parameter which will never change. The algorithm can then be implemented as a 2 of N+1 fingerprinting. This works because as long as there is 1 matching asset, there will be at least 2 subsets (of size 1) that generate the correct fingerprint.

Nothing in the implementations precludes the case where M=N (M>N, of course, makes no sense). This would involve working with the N subsets of size N−1, and would produce the correct fingerprint if all N candidates were the same. However, in this case there is a much simpler algorithm—simply let the expected fingerprint be the hash of all N values concatenated together. This will, with overwhelming probability, be incorrect if any of the assets are incorrect. Thus, a complete fingerprinting implementation could support all cases, from M=1 to M=N, in an efficient manner.

Rather than generate every candidate fingerprint before looking for the mode, a running tally of the most common value so far can be maintained, and the process can be ended if any value occurs more than M times (this virtually guarantees it is the correct fingerprint). If more than M of the N assets are correct, this could result in a much faster execution time. However, as soon as a candidate fingerprint appears more than once, i.e. a mode identified, it is quite likely the correct fingerprint. Therefore, as an alternative implementation, we can use the subset of assets that most recently generated that mode, and check the rest of the N points, one at a time, against M−2 of the points in the subset. With reasonable probability, another point that generates the same candidate fingerprint will quickly be found. This is sufficient confirmation and thus this value can be returned as the fingerprint. If such a point cannot be found, the value is rejected as the mode, and the process can continue to find a new mode. If, after checking all subsets, a better option is not found, this mode is likely invalid.

The computing resources required for executing the fingerprinting algorithms disclosed above grows factorially with N, and borders on impractical for roughly N>10. There are situations where one would want to use a large number of (possibly low quality) assets to produce a sufficiently unique fingerprint. To address this, assets can often be grouped, perhaps by source (application vs. user vs. system), amount of entropy, degree of volatility, or other measurements, into categories. The term "entropy", as used herein, refers to how uniquely a given asset identifies a system. Volatility refers to the likelihood that this asset will change over the lifetime of the application. The threshold value of M can be selected in various manners depending on the category of the assets. This creates multiple $M_i$ of $N_i$ schemes for each computing environment to be fingerprinted and several "sub"-fingerprints. The sub-fingerprints can be combined to produce a final fingerprint.

A slight generalization of the implementation above would allow multiple sub-schemes to be combined in another M of N scheme. Thus, there could be a 2 of (3 of 5, 6 of 8, 4 of 10) scheme. In such a 2-level M of N scheme, it is the result of a given sub-scheme that is used as a "virtual" asset parameter to encrypt the share of the final scheme. Note that a 1 of ($M_1$ of $N_1, \ldots, M_j$ of $N_j$) scheme would have the property that if $M = +M_1 + \ldots + M_j$, or more of $N = N_1 + \ldots + N_j$ assets match, the correct fingerprint will be generated. This makes it a loose M of N scheme in the sense that the correct fingerprint is guaranteed if M or more assets match but may still be generated if fewer than M assets match.

A further generalization would allow arbitrary depth, with M of N subschemes being combined at each level using another M of N scheme, and those schemes being combined with another scheme, and so on. Note that any subscheme, including the final one, can use a combination of real and virtual asset parameters to encrypt shares. Furthermore, any real or virtual asset parameter can be used in multiple subschemes.

An alternative to grouping assets according to defined criteria is grouping them randomly. This would be done purely to improve performance when N is large. In general, assets would be put into one of j groups, and an $M_i$ of $N_i$ scheme created for each group, where $M=M_1+M_2+ \ldots +M_j$ and $N=N_1+N_2+ \ldots N_j$. The results would be combined using a final j of j scheme. In a specific embodiment, N and M can be divided by a constant k, and assets combined using M/k of N/k sub-schemes, with the results combined in a k of k fashion. This makes the original M of N threshold a lower bound as opposed to a tight bound. However, the result is that performance grows linearly with N instead of factorially. As an example, M=20 of N=50 scheme would have over 47 trillion candidate fingerprints to process, while a 2 of {10 of 25, 10 of 25} (k=2) scheme would have only 6 million candidates. This example of the implementation above results in a 7.8 million×performance improvement.

The final fingerprint will match only if each sub-scheme produces the correct value. This scheme will have the property that if fewer than M assets are correct, the fingerprint will be incorrect with high probability. However, it could be the case that M or more assets will be correct, but the computed fingerprint will still be wrong (this would happen if the correct assets are distributed unevenly amongst the subsets). The worst case is where all assets match for every subscheme except one, and fewer than $M_i$ assets match for that subscheme. Therefore, the upper bound for the number of correct assets to guarantee a match is $(N_1+ \ldots +N_{j-1}+M_j)$, assuming without loss of generality (WLOG) that $N_j$ is the smallest subset.

As will be appreciated, the present method provides a way to derive a single result (e.g. a system identifier or a secret) from a number of contributing pieces of information that combined provide a strong identification of a consumer personal apparatus or a person. The method has the novel feature that it produces the same identifier even when some of the initial contributing information is modified, and does so without a priori knowledge of which information is modified. Resilience against such errors is useful for node locking or fingerprinting of an application. As the shares are used directly to calculate the identifier, there is no need to store the original values of the assets. This prevents attacks that target stored values of the original asset parameters. As contrasted to methods that verify the correctness of each share prior to generating a final identifier, which presents a security weakness for software in the white-box attack context, the present method never needs to explicitly check which shares are correct.

The resilience against errors also can be used in authentication if several contributing pieces of information (names, passwords, biometric information, hardware tokens) are requested to provide access to a service or a device and some inputs have changed. In the preceding description, for purposes of explanation, numerous details are set forth in order to provide a thorough understanding of the embodiments.

However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only.

Alterations, modifications and variations can be made to the particular embodiments by those of skill in the art without departing from the scope, which is defined solely by the claims appended hereto.

What is claimed:

1. A change-tolerant method of generating a fingerprint of a computing environment including a plurality of components, each of the components having an asset parameter associated therewith, the method comprising:
   retrieving asset parameters for each of the components;
   grouping the asset parameters into multiple categories based on at least one of source, volatility, and/or amount of entropy of the components corresponding to the asset parameters, each of the categories having at least one asset parameter;
   for each category of asset parameters:
      generating a share corresponding to each asset parameter of the category to produce a plurality of shares;
      modifying the share using the asset parameter;
      applying a secret sharing algorithm to a plurality of subsets of the shares as modified to generate a plurality of candidate identifiers corresponding to the plurality of subsets of shares; and
      selecting a candidate identifier from the plurality of candidate identifiers as a final identifier for the category based at least in part on a frequency of occurrence of that candidate identifier; and
   combining the final identifiers into a fingerprint corresponding to the computing environment, wherein the fingerprint is configured to provide verification of the plurality of components without requiring individual verification of any shares in the plurality of shares, wherein the plurality of shares is equal to N shares where N is the number of components;
   detecting when a specific one of the plurality of candidate identifiers appears more than once;

identifying one of the plurality of subsets of the N shares that most recently produced the specific one of the candidate identifiers;

checking of the N shares, except for the one of the plurality of subsets of the N shares, against M−2 points of the subset, where M is a predetermined threshold value;

finding another share that generates the specific one of the candidate identifiers; and returning the specific one of the candidate identifiers as the final identifier.

2. A change-tolerant method of generating a fingerprint of a computing environment including a plurality of components, each of the components having an asset parameter associated therewith, the method comprising:

retrieving asset parameters for each of the components;

grouping the asset parameters into multiple categories based on at least one of source, volatility, and/or amount of entropy of the components corresponding to the asset parameters, each of the categories having at least one asset parameter;

for each category of asset parameters:
  generating a share corresponding to each asset parameter of the category to produce a plurality of shares;
  modifying the share using the asset parameter;
  applying a secret sharing algorithm to a plurality of subsets of the shares as modified to generate a plurality of candidate identifiers corresponding to the plurality of subsets of shares; and
  selecting a candidate identifier from the plurality of candidate identifiers as a final identifier for the category based at least in part on a frequency of occurrence of that candidate identifier; and combining the final identifiers into a fingerprint corresponding to the computing environment, wherein the fingerprint is configured to provide verification of the plurality of components without requiring individual verification of any shares in the plurality of shares;

wherein applying the secret sharing algorithm comprises:
  selecting random coefficients $a_1, \ldots, a_{m-1}$ for an M−2 dimensional object in M−1 space, where M is a matching threshold, whereby an underlying finite field will be defined by the polynomial $x^{31}+x^3+1$; and the fingerprint will be the value $a_{m-1}$;
  selecting N points on the object, wherein N is the number of assets;
  for each point, selecting $x_1$ through $x_{m-2}$ at random; and calculating $x_{m-1}$.

3. The method of claim 2, wherein the points are encrypted by applying an XOR function to one of the coordinates of the point using the corresponding asset parameter.

4. A change-tolerant method of generating a fingerprint of a computing environment including a plurality of components, each of the components having an asset parameter associated therewith, the method comprising:

retrieving asset parameters for each of the components;

grouping the asset parameters into multiple categories based on at least one of source, volatility, and/or amount of entropy of the components corresponding to the asset parameters, each of the categories having at least one asset parameter;

for each category of asset parameters:
  generating a share corresponding to each asset parameter of the category to produce a plurality of shares;
  modifying the share using the asset parameter;
  applying a secret sharing algorithm to a plurality of subsets of the shares as modified to generate a plurality of candidate identifiers corresponding to the plurality of subsets of shares; and
  selecting a candidate identifier from the plurality of candidate identifiers as a final identifier for the category based at least in part on a frequency of occurrence of that candidate identifier; and combining the final identifiers into a fingerprint corresponding to the computing environment, wherein the fingerprint is configured to provide verification of the plurality of components without requiring individual verification of any shares in the plurality of shares:

wherein the asset parameters are grouped at multiple levels, wherein the result of a sharing scheme at one level defines a virtual asset parameter to be used at another level.

5. A system for generating a change-tolerant fingerprint of a computing environment, the environment including a plurality of components, each of the components having an asset parameter associated therewith, the system comprising:

at least one computer hardware processor;

at least one memory storing instructions thereon which, when executed by the at least one processor, cause the at least one processor to:

retrieve asset parameters for each of the components;

group the asset parameters into multiple categories based on at least one of source, volatility, and/or amount of entropy of the components corresponding to the asset parameters, each of the categories having at least one asset parameter;

for each category of asset parameters:
  generate a share corresponding to each asset parameter of the category to produce a plurality of shares;
  modify the share using the asset parameter;
  apply a secret sharing algorithm to a plurality of subsets of the shares as modified to generate a plurality of candidate identifiers corresponding to the plurality of subsets of shares; and
  select a candidate identifier from the plurality of candidate identifiers as a final identifier for the category based at least in part on a frequency of occurrence of that candidate identifier;

combine the final identifiers into a fingerprint corresponding to the computing environment, wherein the fingerprint is configured to provide verification of the plurality of components without requiring individual verification of any shares in the plurality of shares, wherein the plurality of shares is equal to N shares where N is the number of components;

detect when a specific one of the plurality of candidate identifiers appears more than once;

identify one of the plurality of subsets of the N shares that most recently produced the specific one of the plurality of candidate identifiers;

check of the N shares, except for the one of the plurality of subsets of the N shares, against M−2 points of the subset, where M is a predetermined threshold value;

find another share that generates the specific one of the plurality of candidate identifiers; and return the specific one of the plurality of candidate identifiers as the final identifier.

6. A system for generating a change-tolerant fingerprint of a computing environment, the environment including a plurality of components, each of the components having an asset parameter associated therewith, the system comprising:
- at least one computer hardware processor;
- at least one memory storing instructions thereon which, when executed by the at least one processor, cause the at least one processor to:
- retrieve asset parameters for each of the components;
- group the asset parameters into multiple categories based on at least one of source, volatility, and/or amount of entropy of the components corresponding to the asset parameters, each of the categories having at least one asset parameter;
- for each category of asset parameters:
  - generate a share corresponding to each asset parameter of the category to produce a plurality of shares;
  - modify the share using the asset parameter;
  - apply a secret sharing algorithm to a plurality of subsets of the shares as modified to generate a plurality of candidate identifiers corresponding to the plurality of subsets of shares; and
  - select a candidate identifier from the plurality of candidate identifiers as a final identifier for the category based at least in part on a frequency of occurrence of that candidate identifier;
- combine the final identifiers into a fingerprint corresponding to the computing environment, wherein the fingerprint is configured to provide verification of the plurality of components without requiring individual verification of any shares in the plurality of shares
- wherein applying the secret sharing algorithm comprises:
  - selecting random coefficients $a_1, \ldots, a_{m-1}$ for an M–2 dimensional object in M–1 space, where M is a matching threshold, whereby an underlying finite field will be defined by the polynomial $x^{31}+x^3+1$; and the fingerprint will be the value $a_{m-1}$;
  - selecting N points on the object, wherein N is the number of assets;
  - for each point, selecting $x_1$ through $x_{m-2}$ at random; and calculating $x_{m-1}$.

7. The system of claim 6, wherein the points are encrypted by applying an XOR function to one of the coordinates of the point using the corresponding asset parameter.

8. A system for generating a change-tolerant fingerprint of a computing environment, the environment including a plurality of components, each of the components having an asset parameter associated therewith, the system comprising:
- at least one computer hardware processor;
- at least one memory storing instructions thereon which, when executed by the at least one processor, cause the at least one processor to:
- retrieve asset parameters for each of the components;
- group the asset parameters into multiple categories based on at least one of source, volatility, and/or amount of entropy of the components corresponding to the asset parameters, each of the categories having at least one asset parameter;
- for each category of asset parameters:
  - generate a share corresponding to each asset parameter of the category to produce a plurality of shares;
  - modify the share using the asset parameter;
  - apply a secret sharing algorithm to a plurality of subsets of the shares as modified to generate a plurality of candidate identifiers corresponding to the plurality of subsets of shares; and
  - select a candidate identifier from the plurality of candidate identifiers as a final identifier for the category based at least in part on a frequency of occurrence of that candidate identifier;
- combine the final identifiers into a fingerprint corresponding to the computing environment, wherein the fingerprint is configured to provide verification of the plurality of components without requiring individual verification of any shares in the plurality of shares; and
- wherein the asset parameters are grouped at multiple levels, wherein the result of a sharing scheme at one level defines a virtual asset parameter to be used at another level.

* * * * *